Oct. 6, 1959  G. JEAN  2,907,459
TABLES FOR THE CONCENTRATION OF ORES
Filed Jan. 26, 1955  3 Sheets-Sheet 1
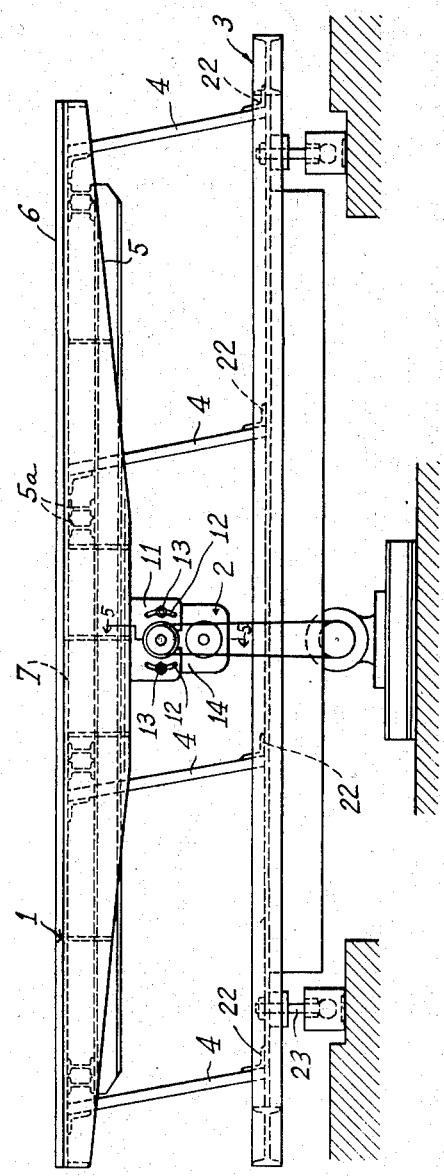
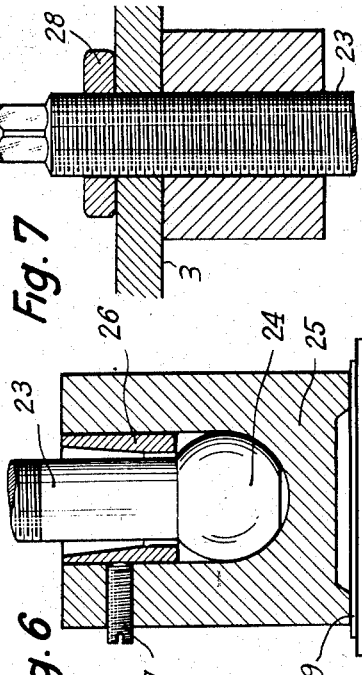
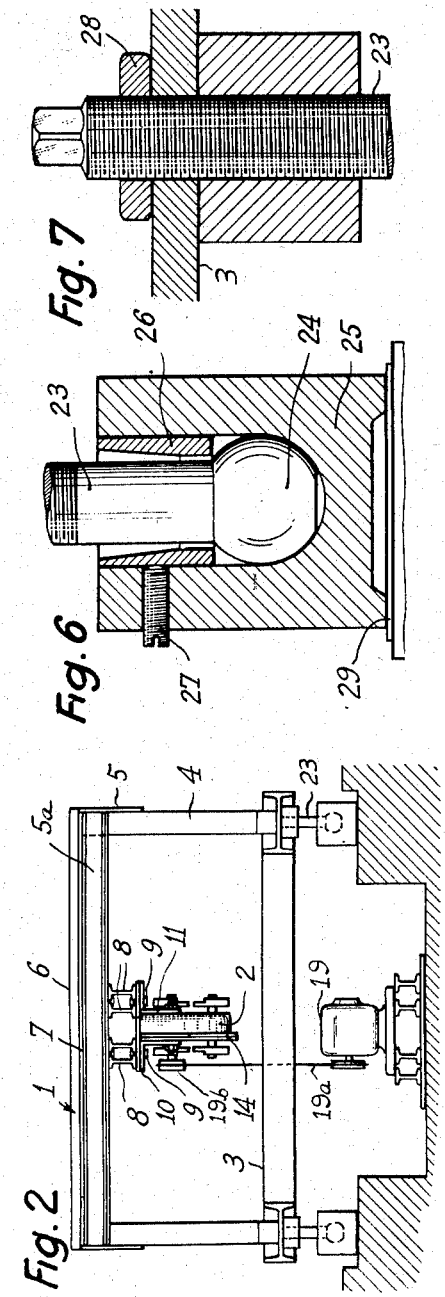

Oct. 6, 1959  G. JEAN  2,907,459
TABLES FOR THE CONCENTRATION OF ORES
Filed Jan. 26, 1955  3 Sheets-Sheet 2

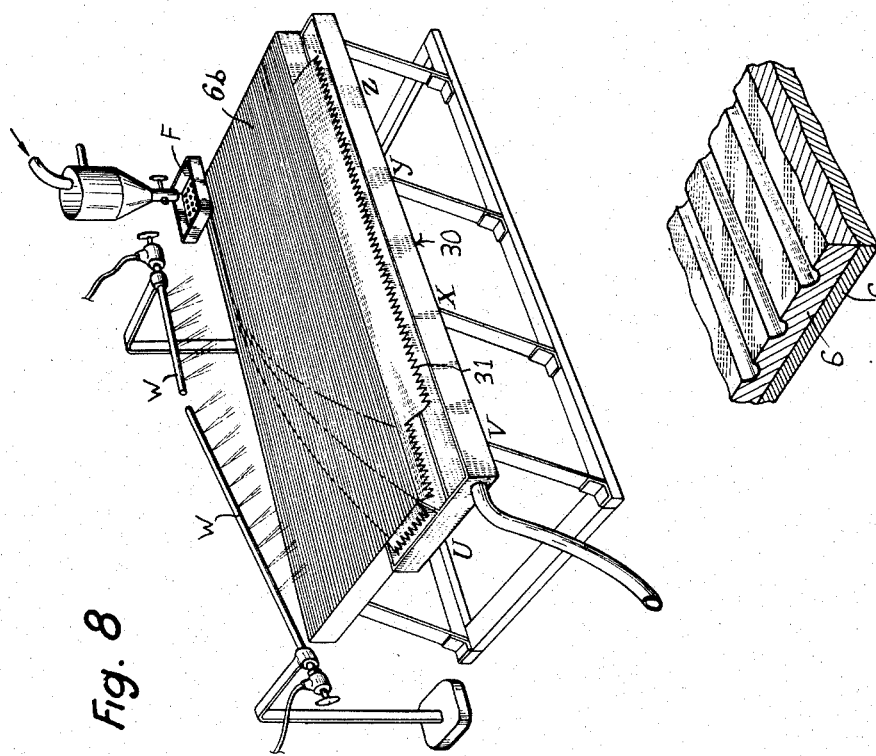
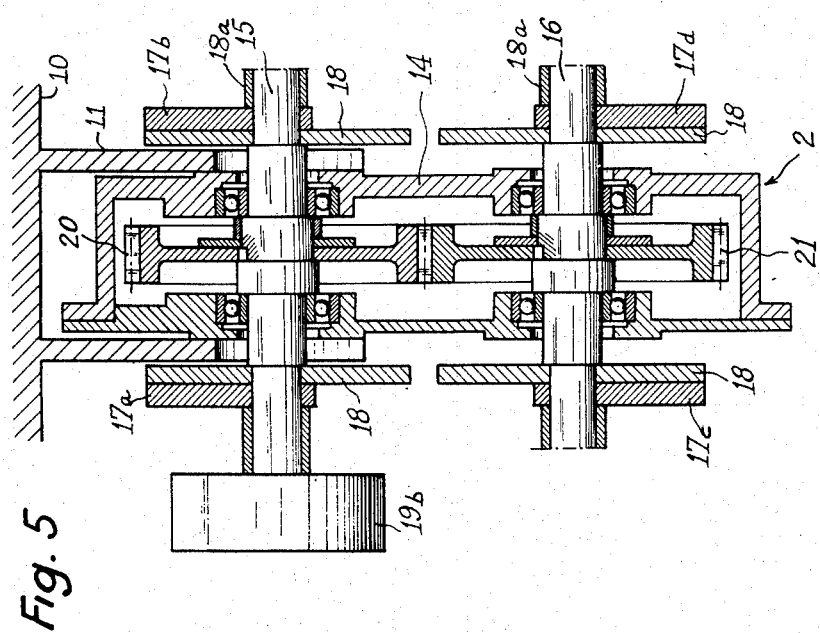

United States Patent Office 2,907,459
Patented Oct. 6, 1959

2,907,459

TABLES FOR THE CONCENTRATION OF ORES

Gilbert Jean, Paris, France

Application January 26, 1955, Serial No. 484,137

Claims priority, application France January 28, 1954

8 Claims. (Cl. 209—504)

The present invention relates to tables that are used for the concentration of ores, and is particularly applicable to the treatment of very fine ores, but can also be used with an increased yield for the treatment of ores comprising larger grains.

Heretofore the concentration of ores by means of tables actuated through rods and eccentrics to produce a shaking movement has been practicable only for grains exceeding 0.25 mm. When the grain size is sufficiently large, such tables provide a rich concentrate that is suitable either for further treatment such as smelting or electromagnetic separation or for sale. The mixed products they produce are sufficiently low in gangue that they may be advantageously re-treated. The tailings contain only a small proportion of valuable products.

The purpose of the invention is to provide a vibrating table capable of producing with a satisfactory output a concentrate from ores having a particle size smaller than 0.25 mm. The table in accordance with the invention is characterized by the fact that vibration is imparted to it from a vibrating device which comprises two parallel shafts rotating at the same speed but in opposite directions, each of the shafts carrying eccentric weights at its ends. The weights at the opposite ends of each shaft are out of phase so that a plane passing through the axis of rotation and the center of gravity of the rotating mass at one end of the shaft does not contain the center of gravity of the rotating mass at the other end. The rotating masses at the opposite ends of each shaft are also preferably of different weight.

In accordance with the invention the phase relation between the two shafts of the vibrating means is such that the unbalance created by the eccentric weights on the one shaft does not counterbalance the unbalance produced by the eccentric weights on the other shaft, but either maintains or augments it. A particularly advantageous arrangement of the weights is such that one shaft has a heavier weight on one end while the other shaft has a heavier weight on the opposite end.

A further feature of the invention is that the table is supported by feet which are not fixed to the floor but terminate in ball joints held in sockets resting on the floor or a suitable support, preferably with a plate of a material such as lead having a low resiliency co-effcient between the sockets and the floor or supports. Each of the feet is preferably adjustable by means of a screw-jack so that the table can readily be tilted to any desired inclination both longitudinally and transversely.

Other features and advantages of the invention will appear from the following description and claims in conjunction with the accompanying drawings in which a preferred embodiment is shown by way of example. In the drawings, Fig. 1 is a side elevation of a table according to the invention.

Fig. 2 is an end elevation of the table.

Fig. 5 is a vertical cross-section through the vibrator approximately on the line 5—5 in Fig. 1.

Fig. 6 is an enlarged vertical section showing one of the feet of the table.

Fig. 7 is a similar section showing in detail the means for adjusting the feet of the table.

Fig. 8 is a diagrammatic perspective view illustrating the operation of the table.

Fig. 10 is an enlarged fragmentary section of the table top.

Figure 3:
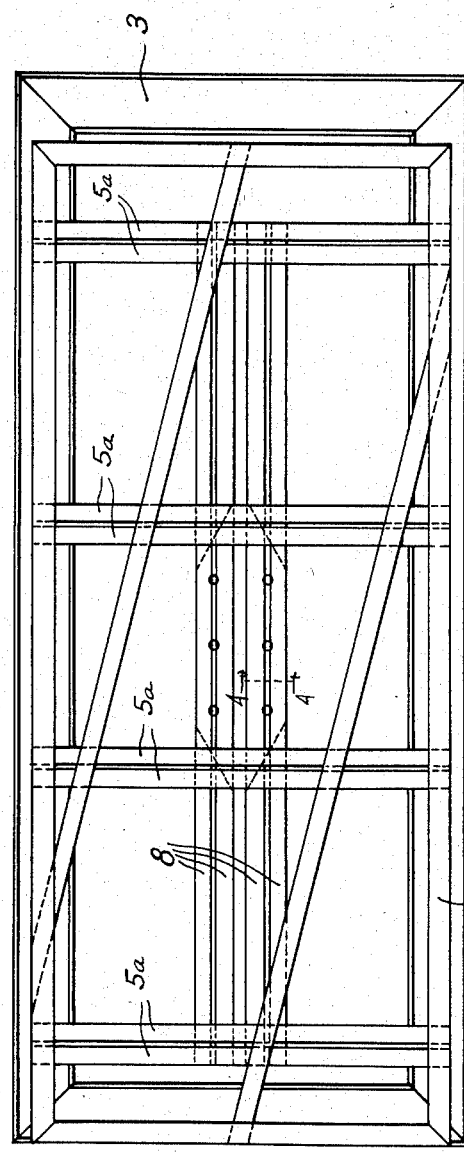
Fig. 3 is a plan view with the top of the table omitted.

The apparatus in accordance with the invention as illustrated in the drawings, comprises a movable table 1, a vibrator 2 fixed to the table and a stationary frame 3 to which the legs 4 of the table are fixed. The movable table 1 has a steel frame comprising longtiudinally extending stringers 5 at the sides of the table, and a plurality of I-section cross pieces 5a welded to the stringers to provide a rigid assembly. The stringers 5 are truss shaped, being wider in their central portions and tapering towards the ends, and are reinforced by internal ribbing in order to withstand the vibration. On this frame there is fixedly mounted a table top or plate comprising a sheet 6 of linoleum, vinyl-chloride or other material providing a smooth abrasion resistant surface, which may, if desired, be backed by a sheet of plywood or other suitable material 6a. A plurality of riffles 6b extend longitudinally of the plate 6.

As illustrated in Fig. 10, the riffles instead of being formed by strips secured to the table, are provided by means of semi-circular grooves. The width, depth and spacing of the grooves may be varied according to the material to be treated. For example, the depth and width of the grooves may be in the range of ⅛″ to ⅜″ and the spacing may be in the range of 1″ to 2″.

Figure 4:
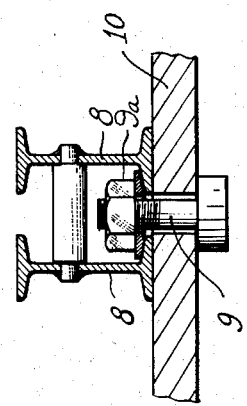
Fig. 4 is an enlarged fragmentary section taken approximately on the line 4—4 of Fig. 3, and showing the connection between the table and the vibrator.

The vibrator 2 is secured to the underside of the table 1 in the following manner. Slides 8 are fixed to the cross pieces 5 by means of bolts. Each of the slides 8 comprises a pair of I-bars spaced a short distance apart. A series of bolts 9 pass between the lower flanges of the I-bars of the slides 8 (Fig. 4) and through holes in the base 10 of the vibrator. The bolts 9 are provided with nuts 9a and secure the base 10 of the vibrator to the slides 8 and hence to the table so as to provide in effect an integral structure. The base 10 has spaced downwardly projecting supports 11 each of which is provided with two arcuate shaped slots 12 (Fig. 1). These slots receive studs 13 which are solid with the casing 14 of the vibrator proper. Angular adjustment of the vibrator is permitted by displacement of the studs 13 in the arcuate slots 12 of the supports 11, the vibrator being secured in adjusted position by tightening nuts screwed on the threaded outer ends of the studs 13.

As the slides 8 can be placed obliquely with respect to the longitudinal axis of the table it will be seen that adjustment is provided by positioning the slides 8 relative to the table, moving the base 10 longitudinally of the slides and tilting the casing 14 of the vibrator relative to the supports 11 carried by the base 10.

The vibrator 2 comprises two parallel axles or shafts 15 and 16 which are disposed one above the other and are rotatably supported by anti-friction bearings in the casing 14. Discs 18 are fixedly mounted on opposite end portions of each of the shafts outside the casing 14, and sector shaped weights 17a, 17b, 17c and 17d have holes through which said shafts extend and are secured to the discs 18 in selected angular position, for example by being clamped against the discs by means of nuts 18a screwed on threaded portions of the shafts. The shaft 15 is driven by a motor 19 (Fig. 2) through a suitable flexible drive shown as a belt 19a engaging a pulley 19b on the shaft 15. A gear wheel 20 on shaft 15 inside the casing 14 meshes with an identical gear carried by the shaft 16 so that the two shafts are rotated in synchronism with one another at the same speed but in opposite directions. Lubrication is provided by the projection of oil into the casing 14.

In accordance with the invention the weights 17a–d are arranged to produce primary and secondary vibrations. This is accomplished by using weights of different values and fixing the weights to the disc 18 in selected angular relationship. The angular extent of each weight is preferably of the order of 30° to 45°. When the weight 17a is up and the weight 17c is down, the two weights are considered to be in phase with one another, since the shafts rotate in opposite directions. If the weights are now shifted angularly relative to one another, they are out of phase. Preferably the weights 17a and 17c are out of phase with one another as are also the weights 17b and 17d. The weight on one end of each shaft may also be out of phase with the weight on the opposite end of the same shaft. The amount the weights are out-of-phase is preferably less than the angular extent of the weight sectors.

Different values of weights are also used to obtain the desired movement of the table. The weight on one end of one shaft and the weight on the opposite end of the other shaft, for example weights 17b and 17c, are preferably equal. The other two weights are preferably unequal and not less than 70% of the first two mentioned weights. For example, 17b and 17c may be ten pounds, 17a seven pounds and 17d eight pounds. The spacing of the two shafts is such as to provide clearance between the discs 18, being somewhat more than the diameter of the discs. In the embodiment shown in the drawing the discs 18 have a diameter of 7¼ and the shafts are 8″ apart.

The stationary frame 3 is rigid and of high inertia, consisting of large I-bars welded to each other. The weight of this frame is calculated so as to withstand the driving action of the vibrator in the direction of the general resultant of the vibrating motion.

The legs 4 by means of which the table 1 is mounted on the stationary frame 3 are formed of flexible strips of plywood or other suitable material capable of repeatedly flexing without breaking. The number of legs may be varied according to the size and weight of the table, eight legs being employed for the table illustrated in the drawing. The inclination of the strips 4 relative to the frame 3 may be adjusted by means of brackets 22 which connect the lower ends of the strips with I-bars of the frame. The upper ends of the strips 4 are connected with cross members of the table 1.

The frame 3 is not fixed to the ground but is supported by means of four screw jacks 23, the threaded upper portions of which screw into threaded holes provided in the frame 3 (Fig. 7). The lower end of each of the screw jacks 23 terminates in a ball 24 resting in a socket 25. A sleeve 26 held in place by a set screw 27 prevents the ball 23 from getting out of the socket. The inner surface of the sleeve is tapered outwardly at its upper end as shown in Fig. 6 so as to make it possible to increase the angle of inclination of the screw jacks. Each of the screw jacks is independently adjustable and is locked in adjusted position by means of a nut 28. The up and down adjustment of the individual jacks makes it possible to give any desired angle of inclination to the table so that the table may be tilted cross-wise as well as lengthwise. The sockets 25 can rest on the floor or foundation, or on suitable blocks or other supporting surfaces. In accordance with the invention a plate 29 formed of lead or other material having a low resiliency co-efficient is interposed between each of the sockets 25 and the supporting surface. The plate 25 is for the purpose of vibration damping.

The electric motor 19 for driving the vibrator may be mounted on the stationary frame 3 or on the floor or foundation for the apparatus, as illustrated in Fig. 2.

The feeding of the table is effected in a known manner, for example from a feed tray F feeding the material to an area in the upper corner of the table (Fig. 8). From this area the particles of material are moved forward on the table in the direction of the riffles by the vibratory movement of the table while a water distributor W supplies a sheet of water the direction of which is oblique relative to the direction of the riffles. As the separation proceeds, the material is discharged from the table into a receiving trough 30, comprising sections U, V, X, Y and Z. The lighter material is washed across the table by the streams of water and discharges into sections Y and Z of the trough, while the heavier material is moved lengthwise of the table by the vibratory movement of the matter and discharges into sections U and V. The heaviest material will discharge in sections U of the trough, while the lightest will discharge in section Z. Mixed material and material of intermediate density will discharge in section X. The trough may be provided with suitable discharge openings or passageways as desired, and an apron 31 having a serrated edge extends out from the table over the discharge trough to facilitate discharge of material into the trough. While the trough 31 has been shown as being divided into five sections, more or fewer can be used. For many purposes three sections are sufficient, one for concentrates, mixed and tailings respectively.

The ore particles are crushed and separated through screens of 100 to 300 mesh in one or several operations. The 100 mesh corresponds to particles of 150 microns across and to a 100 Tyler screen. The 300 mesh corresponds to particles of 50 microns and a 270 Tyler screen. The purpose of the grading as to size is to provide particles having substantially the same volume so that satisfactory separation may be obtained according to their density. With the table of the present invention it is possible to operate with particles having a fineness of a few microns whereas with known tables no effective separation can be obtained with such small particle sizes.

The many trials that have been carried out with the table of the invention have given surprising results. Despite the extreme fineness of the particles involved, clearly defined strips of materials of different densities are formed on the table and are particularly visible if the mineral salts forming the mixture being separated have bright colors which stand out against the background of the table. The inclination of the table may be adjusted by using screw jacks 23 in such manner that the separation between successive strips of different components is clear and sharp, thus reducing to a minimum the amount of mixed products.

Without being able to advance a positive explanation of the surprising results thus obtained, it is thought than an explanation may be looked for in the following facts.

First of all, the structure of the table and the fact that the feet are not fixed make it possible to have the vibrator run at high speeds, for example, speeds over 1000 r.p.m., and preferably of the order of 1200 r.p.m., whereas most of the known tables are actuated by mechanism producing only a few hundred oscillations per minute. This rapid vibration of the table in accordance with the invention permits an instantaneous fall of the ore particles and produces an immediate grading according to the density. The heaviest particles reach the bottom of the riffles almost instantaneously with the effect that they are thus withdrawn from the action of the oblique water streams.

On the other hand, the speed of the forward motion in the direction of the riffles is very high owing to the inequality between the phases of forward and backward movement of the table. This phenomenon is very easily shown in the following manner. If one traces a line on the table while in motion by moving a pencil perpendicularly to the direction of the fillets with a substantially uniform movement, a curve like the one represented in Fig. 9 appears on the table showing the variations of the displacement $d$ relative to the time $t$. It will be seen that the durations $t1$ and $t2$ representing the forward and backward movement respectively are quite different. The rate of advancement of the table in the direction of the riffles—much higher than with known tables—affects primarily the particles adhering most closely to the table, i.e., the heaviest particles. As the grains become lighter the influence of the movement of the table decreases and that of the water streams increases.

Figure 9:
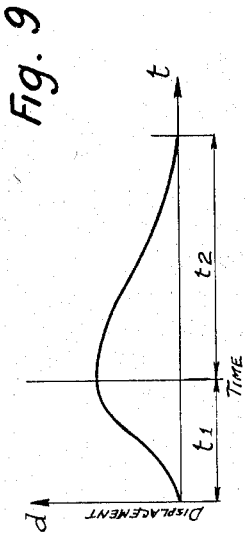
Fig. 9 is a curve showing the movement of a table according to the invention.

The movement illustrated by the curve of Fig. 9 is obtained by combining at least two vibratory movements having different directions. In addition to the main vibratory movement that would be produced if the weights were arranged in a known manner, there are secondary vibratory movements resulting from the fact that the centers of gravity of the rotating masses located at the extremities of one of the shafts of the vibrating mechanism are not in the same plane passing through their axes of rotation and by the inequality of the two rotating masses. These secondary vibratory movements improve the grading by raising the lightest grains which are then carried away by the water current. Effective separation can thus be obtained even with the fine particles because they are advanced in the direction of the riffles by the vibratory movement of the table.

The following example will illustrate the results obtained with a table according to the invention. The material treated was 50 kgs. of crude Smaltine containing approximately 8.5 of cobalt and nickel and about 20% of silica. The aim was substantially complete elimination of silica. The treatment heretofore used is a melting operation for Speiss. Such treatment is quite expensive and causes the loss of about 5% of the cobalt. By passing the material over a table in accordance with the invention it was possible to obtain a concentrate with a very low silica content. The results are indicated in the following tabulation in which the letters U, V, X, Y, Z denote the different zones or trough sections indicated by the same letters in Fig. 8.

| Screen Size | Zone | Content in Co+Ni | Content in SiO$_2$ | Co+Ni Percentage |
|---|---|---|---|---|
| 40-180 | U | 14.30 | 0.85 | |
|  | V | 13.55 | 6.60 | 93 |
|  | X | 8.0 | 25.15 | |
|  | Y | 3.10 | 48.85 | 5.2 |
|  | Z | (deads) 0.80 | 63.20 | 1.7 |
| 180-250 | U | 13.05 | 0.33 | |
|  | V | 14.56 | 1.50 | 96 |
|  | X | 13.54 | 4.16 | |
|  | Y | 1.20 | 52.38 | 3 |
|  | Z | (deads) 2.27 | 55.66 | 1 |
| 250 | U | 12.96 | 0.10 | |
|  | V | 14.97 | 0.24 | 86.5 |
|  | X | 14.42 | 1.72 | |
|  | Y | 12.50 | 4.53 | |
|  | Z | (deads) 6.88 | 71.60 | 13.5 |

By passing the tailings and mixed products over the table again, approximately half of the cobalt they contain may be recovered. The average yield is thus 96% in two operations. It is then equal if not higher than that of the melting operation which is far more expensive than the use of a table according to the invention. The residue of the burned concentrate contains all the gold and all the uranium. By passing this residue over the table according to the invention it is possible to recover 90% of the metals contained in the most economical way.

Moreover, the table according to the invention offers the advantage that the above described phenomena which make it possible to separate particles substantially finer than it was heretofore possible to handle are not disturbed by echo or resonance. With known apparatus, reflected waves have tended to arise because of the feet being fastened down. In accordance with the invention the feet are not fixed to the floor and the reflection of waves from the feet is further avoided by the provision of a layer of low resiliency material between the feet and the floor, as described.

A further feature of the invention is that the adjustability provided permits precise adjustment of the apparatus to obtain the best results with the particular ore to be treated. The masses of the rotating weights and also the relative position of the weights on the shafts can be readily modified as desired. The screw jacks that support the stationary frame permit ready adjustment of the inclination of the table both laterally and longitudinally.

It will be understood that the invention is in no way limited to the particular embodiment shown and described it being possible to modify the specific construction while still retaining the essence of the invention as defined by the following claims.

What I claim and desire to secure by Letters Patent is:

1. In apparatus for concentrating pulverized ore, a base, feet means for supporting said base in variable relation to the horizontal, said feet means being constructed to rest freely on a supporting surface without connection thereto, a table having a riffled surface, means for movably supporting said table on said base with greater freedom of movement in a longitudinal direction than in a transverse direction, and a vibrating device mounted on and carried solely by said table but free from connection with said base and free from rigid connection with said supporting surface, said vibrating device comprising two substantially parallel shafts disposed one above another, eccentric weights carried by each of said shafts at their opposite ends and means for rotating said shafts at the same speed but in opposite directions to induce a high rate of vibration to said table, the centers of gravity of the weights at the opposite ends of a shaft being in different radial planes disposed at an angle to one another and thus out of phase with one another, and means for limiting lateral movement of said feet means relatively to said supporting surface.

2. Apparatus according to claim 1, in which the weight at one end of one of each of said shafts is heavier than the weight at the other end of the same shaft.

3. Apparatus according to claim 2 in which the heavier weights on said shafts are at opposite ends thereof.

4. In apparatus for concentrating pulverized ore, a base, screw jacks supporting said base and adjustable to vary the relation of the base to the horizontal, said jacks being constructed to rest freely on a supporting surface without connection thereto, a table, resilient legs fixed at opposite ends to the base and table respectively to support said table movably with respect to said base, and vibrating means for imparting a high rate of vibratory movement to said table, said vibrating means being free from connection with said base and free from rigid connection with said supporting surface, said vibrating means comprising rigid supports fixed to said table but free from connection with said base, two substantially parallel shafts rotatably supported by said supports, said shafts extending transversely of said table and disposed one above another, eccentric weights carried by each of said shafts at their opposite ends, and means for rotating said shafts at the same speed, and means for limiting lateral movement of said screw jacks relatively to said supporting surface.

5. Apparatus according to claim 4, in which each of said screw jacks terminates in a ball and said means for limiting lateral movement is a socket receiving and supporting said ball.

6. Apparatus according to claim 5, in which each of said sockets is supported by material having a low resiliency coefficient.

7. In apparatus for concentrating ore, a base, feet means for supporting said base in variable relation to the horizontal, said feet means being constructed to rest freely on a supporting surface without connection thereto, a table, means for movably supporting said table with greater freedom of movement in a longitudinal direction than in a transverse direction, spaced supports fixed to the underside of said table, and vibrating means for imparting a high rate of vibratory movement to said table, said vibrating means being free from connection with said base and free from rigid connection with said supporting surface, said vibrating means comprising two substantially parallel shafts rotatably carried by said supports, said shafts extending transversely of said table and being disposed one above another, eccentric weights carried by each of said shafts at the opposite ends thereof and means for rotating said shafts at the same speed but in opposite directions, and means for limiting lateral movement of said feet means relatively to said supporting surface.

8. Apparatus according to claim 7, in which means is provided for varying the angular relationship of said supports to said table.

References Cited in the file of this patent

UNITED STATES PATENTS

| | | |
|---|---|---|
| 1,696,918 | Lide | Jan. 1, 1929 |
| 1,705,619 | Kendall | Mar. 19, 1929 |
| 2,188,482 | Parks | Jan. 30, 1940 |

FOREIGN PATENTS

| | | |
|---|---|---|
| 11,440 | Great Britain | June 1, 1899 |